(No Model.)
G. W. LLOYD.
JOINT FOR GAS OR WATER PIPES.
No. 494,147. Patented Mar. 28, 1893.
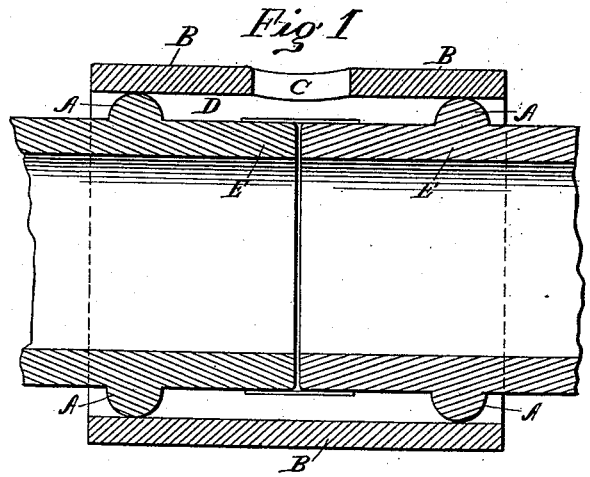
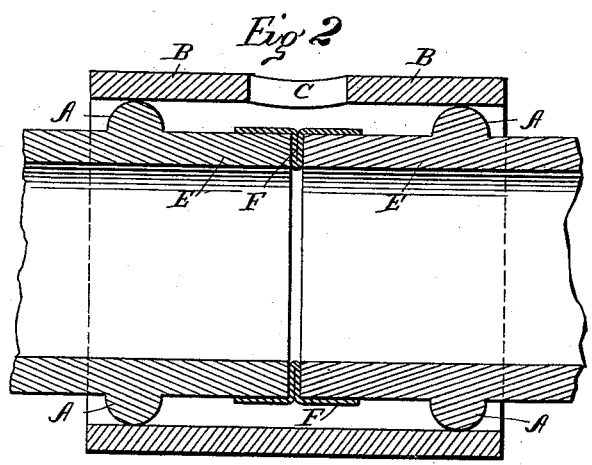
Witnesses
C. C. Bindine
L. S. Bacon
Inventor
G. W. Lloyd
By Thos. S. Sprague & Son
Attorneys

UNITED STATES PATENT OFFICE.

GORDON W. LLOYD, OF DETROIT, MICHIGAN.

JOINT FOR GAS OR WATER PIPES.

SPECIFICATION forming part of Letters Patent No. 494,147, dated March 28, 1893.

Application filed January 30, 1892. Serial No. 419,842. (No model.)

*To all whom it may concern:*

Be it known that I, GORDON W. LLOYD, of Detroit, in the county of Wayne and State of Michigan, have invented a new and useful Improvement in Joints for Gas and Water Piping, which improvement is fully set forth in the following specification, reference being had to the accompanying drawings.

The object of my invention is to provide an improved joint for piping, more especially for gas and water pipes, by which the same can be made with great facility, and certainty doing away entirely with the necessity and uncertainty of lead calking as practiced with the ordinary bell and spigot joint; requiring no special skilled labor; and at much reduced cost both of pipe and material; capable also of being readily taken apart and restored, and having all the advantages of a flanged joint in respect of admitting of removal and replacement of a broken pipe without disturbance to those adjoining. Further I am thereby able to give equal strength to the pipe at the joint as elsewhere, and to provide when desired for expansion and contraction of the pipe without injury or leakage.

Figure 1, is a longitudinal section through the meeting ends of the two parts embodying my improved joint. Fig. 2, is a longitudinal section of the same with an elastic packing. Fig. 3, is a detail view of the packing.

The details of my invention are as follows. In the case of cast iron pipe, in place of the ordinary cumbersome bell and spigot joint ends, I cast the pipe the same at both ends, with uniform projections or beads all round on the outside, a distance of one or more inches, according to size of pipe, back from the end of the pipe, as A A, Fig. 1. I then use a surrounding collar or sleeve B. of a length sufficient when the ends of pipes are brought together to lap beyond the beads A. A. and of a diameter just sufficient to admit of passing over the same. When the collar B is adjusted equidistant over the beads A A, the ends of the pipes to be jointed being together, an annular chamber D is thereby formed, surrounding the junction of the two ends of the pipes. In the collar B. I have a perforation or hole C.

In actual operation I proceed to form the joint as follows. The collar B is slipped on over the end of one pipe. The ends of both pipes being then brought together and adjusted in line, the joint between the ends is first covered with a strip of paper, canvas, elastic gum or any suitable material made adhesive. The collar B is then driven back to a position equidistant over the beads A A thereby firmly securing the pipes laterally in position. The hole C is left uppermost. I then fill the annular chamber D. through the hole C. with lead or any cement capable of being temporarily liquefied, preferably with asphaltum. On the same becoming solid, the joint is perfected.

When I wish to specially provide for contraction and expansion of the pipes, in place of the adhesive covering strip, which serves chiefly the purpose of preventing the liquefied cement from escaping internally through the joint, but also admits of a slight contraction without danger of rupture; I employ a U shaped disk or gasket of flexible material, preferably sheet lead, as shown in Fig. 3, the inner diameter of same being that of the pipe to be jointed. I place the disk in the joint between the ends of pipes, and the same being adjusted I dress down the flanges of the lead close over the exterior surfaces of the pipes the lead then assuming the shape shown by F. F. Fig. 2, or the gasket may be formed in that shape and applied. I proceed then to complete the joint in the same manner as before described.

When I desire for any reason to disjoint one or more pipes I drive the collar B back over one of the pipes breaking the adhesion of the cement, or in the case of pitch or asphalt, softening it by heat. The joint can then be reconstructed, a new pipe inserted, or cleared, by performing the operation in the same manner as before.

What I claim as my invention, and desire to secure by Letters Patent, is—

In a pipe joint the combination of the abutting ends of the pipes, a folded flexible packing thereon with the fold at the joint interposed between the ends, ribs formed on the pipes near the ends, and apertured sleeves embracing the joint and overlapping the ribs at each end, forming a chamber, the ends of which are formed by the ribs, the outer wall by the sleeve, the inner wall by the pipe and a filling of cement in said chamber, substantially as described.

GORDON W. LLOYD.

Witnesses:
SIDNEY T. MILLER,
FRED T. SIBLEY.